United States Patent
Lu et al.

(10) Patent No.: US 9,253,495 B2
(45) Date of Patent: Feb. 2, 2016

(54) METHODS AND APPARATUS FOR IMPROVED CHROMA TRANSFORMS FOR INTER FRAMES IN VIDEO ENCODING AND DECODING

(75) Inventors: Xiaoan Lu, Princeton, NJ (US); Peng Yin, Ithaca, NY (US); Qian Xu, Folsom, CA (US); Joel Sole, La Jolia, CA (US); Yunfei Zheng, San Diego, CA (US)

(73) Assignee: THOMSON LICENSING, Issy-Les Moulineaux (FR)

( * ) Notice: Subject to any disclaimer, the term of this patent is extended or adjusted under 35 U.S.C. 154(b) by 632 days.

(21) Appl. No.: 13/509,133

(22) PCT Filed: Nov. 24, 2010

(86) PCT No.: PCT/US2010/003035
§ 371 (c)(1),
(2), (4) Date: May 10, 2012

(87) PCT Pub. No.: WO2011/068527
PCT Pub. Date: Jun. 9, 2011

(65) Prior Publication Data
US 2012/0230394 A1   Sep. 13, 2012

Related U.S. Application Data

(60) Provisional application No. 61/266,537, filed on Dec. 4, 2009.

(51) Int. Cl.
*H04N 7/12* (2006.01)
*H04N 11/02* (2006.01)
(Continued)

(52) U.S. Cl.
CPC ........... *H04N 19/186* (2014.11); *H04N 19/122* (2014.11); *H04N 19/137* (2014.11); *H04N 19/176* (2014.11); *H04N 19/46* (2014.11); *H04N 19/61* (2014.11)

(58) Field of Classification Search
USPC .................................................... 375/240.02
See application file for complete search history.

(56) References Cited

U.S. PATENT DOCUMENTS

2007/0025631 A1* 2/2007 Kim et al. ..................... 382/248
2009/0003441 A1   1/2009 Sekiguchi et al.
(Continued)

FOREIGN PATENT DOCUMENTS

| CN | 101394565 | 3/2009 |
|----|-----------|--------|
| JP | 2004254327 | 9/2004 |

(Continued)

OTHER PUBLICATIONS

Chen et al., "Video Coding Using Extended Block Sizes", ITU—Telecommunications Standardization Sector, Document: VCEG-Aj23, 36th VCEG Meeting, San Diego, CA, Oct. 8-10, 2008.

(Continued)

*Primary Examiner* — Hee-Yong Kim
(74) *Attorney, Agent, or Firm* — Robert D. Shedd; Ronald J. Kolczynski

(57) ABSTRACT

Methods and apparatus are provided for improved chroma transforms for inter frames in video encoding and decoding. The apparatus and method encode at least a portion of a picture using inter-coding, wherein a transform is adaptively selected, from among a plurality of transforms, to apply to chroma components of the portion responsive to at least one selection criterion.

13 Claims, 11 Drawing Sheets

(51) Int. Cl.
  *H04N 11/04* (2006.01)
  *G06K 9/36* (2006.01)
  *G06K 9/46* (2006.01)
  *H04N 19/186* (2014.01)
  *H04N 19/176* (2014.01)
  *H04N 19/46* (2014.01)
  *H04N 19/122* (2014.01)
  *H04N 19/61* (2014.01)
  *H04N 19/137* (2014.01)

(56) References Cited

U.S. PATENT DOCUMENTS

2009/0028427 A1   1/2009   Yamada et al.
2014/0126632 A1   5/2014   Lu et al.

FOREIGN PATENT DOCUMENTS

JP    2008193627      8/2008
WO    WO2009001864   12/2008

OTHER PUBLICATIONS

Kruafak, "Hybrid Video Coding Design with Variable Size Integer Transforms and Structural Similarity", Thesis University of Texas at Arlington, Dec. 1, 2008, pp. 1-141.

Wien, "Variable Block-Size Transforms for H.264/AVC", IEEE Transactions on Circuits and Systems for Video Technology, vol. 13, No. 7, Jul. 1, 2003, pp. 604-613.

Wien, "Variable Block-Size Transforms for Hybrid Video Coding", Dissertation Der Rheinisch-Westfaelischen Technischen Hochschule Aachen, Feb. 3, 2005, Part 1 and Part 2.

ITU-T H.264 Standard, "Advanced Video Coding for Generic Audiovisual Services", International Telecommunication Union, Mar. 2005, 343 pages.

Yamamoto et al., "Analysis on Transform and Partition Selection in Extended Block Sizes and Modification of Block Transforms", ITU—Telecommunications Standardization Sector, VCEG 37th Meeting, Document: VCEG-AK19, Apr. 10, 2009, 5 pages.

ITU Telecommunication Standardization Sector G16 Study Group 16, Jan. 2009.

Search Report dated Mar. 2, 2011.

* cited by examiner

METHODS AND APPARATUS FOR IMPROVED CHROMA TRANSFORMS FOR INTER FRAMES IN VIDEO ENCODING AND DECODING

CROSS-REFERENCE TO RELATED APPLICATIONS

This application claims the benefit, under 35 U.S.C. §365 of International Application PCT/US10/03035, filed Nov. 24, 2010, which was published in accordance with PCT Article 21(2) on Jun. 9, 2011 in English and which claims the benefit of U.S. provisional patent application No. 60/266,537, filed Dec. 4, 2009.

TECHNICAL FIELD

The present principles relate generally to video encoding and decoding and, more particularly, to methods and apparatus for improved chroma transforms for inter frames in video encoding and decoding.

BACKGROUND

A popular and effective video coding method, often referred to as a block-based hybrid encoding method, involves using block-based temporal prediction and transform coding. This method is essentially the core of all the international video coding standards.

In a block-based hybrid video encoder, each picture is divided into blocks. Each block in an inter picture is coded using a combination of motion-compensated prediction and transform coding. While the motion-compensated prediction removes the temporal correlation, the transform coding further de-correlates the signals in the spatial domain and compacts the energy into a few coefficients.

Different transforms have been developed for various international standards. In the standards prior to the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), the transform block size has typically been 8×8. The 8×8 transform size has the advantages of being dyadic, large enough to capture trends and periodicities while being small enough to minimize spreading effects due to local transients over the transform area.

In the MPEG-4 AVC Standard, three additional transforms are also available for use as follows:
  A Hadamard transform for the 4×4 array of luma DC coefficients in intra macroblocks predicted in 16×16 mode;
  A Hadamard transform for the 2×2 array of chroma DC coefficients in any macroblock; and
  A 4×4 DCT-based transform.

This smaller size of 4×4 enables the encoder to better adapt the prediction error coding to the boundaries of moving objects, to match the transform block size with the smallest blocks size of the motion compensation, and to generally better adapt the transform to the local prediction error signal.

To encode the residual data of the luma component for inter frames, the encoder chooses from 8×8 and 4×4 transforms. In contrast, the transform is fixed for the chroma component as follows: a 4×4 transform cascaded with a 2×2 Hadamard transform for DC coefficients.

Transforms for Luma and Chroma Residue for Inter Pictures in KTA

VCEG "key technical area" (KTA) software has provided a common platform to integrate the new advances in video coding after the finalization of the MPEG-4 AVC Standard. The proposals to use extended block sizes and large transforms were adopted into KTA. In the current KTA software, motion partitions larger than 16×16 pixels are implemented. In particular, macroblocks of sizes 64×64, 64×32, 32×64, 32×32, 32×16, 16×32 are used in addition to the existing MPEG-4 AVC Standard partitioning sizes. Larger block transforms are also used to better capture the usually smoother content in high-definition video. The larger block transforms include 16×16, 16×8, and 8×16 transforms. Note that all these new transforms are applied to the luma components. The transform for the chroma component is the same as the MPEG-4 AVC Standard, which is a cascaded 4×4 transform. Such a fixed transform does not consider the characteristics of the video content.

Typical Chroma Transform

Turning to FIG. 1, a conventional method for chroma encoding in a video encoder is indicated generally by the reference numeral 100. The method 100 includes a start block 110 that passes control to a loop limit block 120. The loop limit block 120 begins a first loop (Loop (1)), using a variable j having a range from 1, . . . , number (#) of pictures (e.g., in an input video sequence), and passes control to a loop limit block 130. The loop limit block 130 begins a first loop (Loop (2)), using a variable i having a range from 1, . . . , number (#) of blocks (e.g., in a current picture of the input video sequence), and passes control to a function block 140. The function block 140 encodes the luma components for block i in picture j, and passes control to a function block 150. The function block 150 encodes the chroma components for block i in picture j with a fixed transform, and passes control to a loop limit block 160. The loop limit block 160 ends the Loop (2), and passes control to a function block 170. The function block 170 ends the Loop (1), and passes control to an end block 199.

Turning to FIG. 2, a conventional method for chroma decoding in a video decoder is indicated generally by the reference numeral 200. The method 200 includes a start block 210 that passes control to a loop limit block 220. The loop limit block 220 begins a first loop (Loop (1)), using a variable j having a range from 1, . . . , number (#) of pictures (e.g., in an input video sequence), and passes control to a loop limit block 230. The loop limit block 230 begins a first loop (Loop (2)), using a variable i having a range from 1, . . . , number (#) of blocks (e.g., in a current picture of the input video sequence), and passes control to a function block 240. The function block 240 decodes the luma components for block i in picture j, and passes control to a function block 250. The function block 250 decodes the chroma components for block i in picture j with a fixed transform, and passes control to a loop limit block 260. The loop limit block 260 ends the Loop (2), and passes control to a function block 270. The function block 270 ends the Loop (1), and passes control to an end block 299.

Hence, regarding method 100, as noted above, the transform is fixed for each block and each picture for chroma, while the luma component may use adaptive transforms. As part of method 100, the luma component of the block is encoded, possibly with an adaptively chosen transform. However, the chroma component is always encoded and, hence, also decoded (e.g., by method 200), with a fixed transform. Disadvantageously, as noted above, such a fixed transform does not consider the characteristics of the video content.

SUMMARY

These and other drawbacks and disadvantages of the prior art are addressed by the present principles, which are directed to methods and apparatus for improved chroma transforms for inter frames in video encoding and decoding.

According to an aspect of the present principles, there is provided an apparatus. The apparatus includes a video encoder for encoding at least a portion of a picture using inter-coding. A transform is adaptively selected, from among a plurality of transforms, to apply to chroma components of the portion responsive to at least one selection criterion.

According to another aspect of the present principles, there is provided a method in a video encoder. The method includes encoding at least a portion of a picture using inter-coding. A transform is adaptively selected, from among a plurality of transforms, to apply to chroma components of the portion responsive to at least one selection criterion.

According to yet another aspect of the present principles, there is provided an apparatus. The apparatus includes a video decoder for decoding at least an inter-coded portion of a picture using a transform adaptively selected for application to chroma components of the inter-coded portion. The transform is adaptively selected responsive to at least one selection criterion.

According to still another aspect of the present principles, there is provided a method in a video decoder. The method includes decoding at least an inter-coded portion of a picture using a transform adaptively selected for application to chroma components of the inter-coded portion. The transform is adaptively selected responsive to at least one selection criterion.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
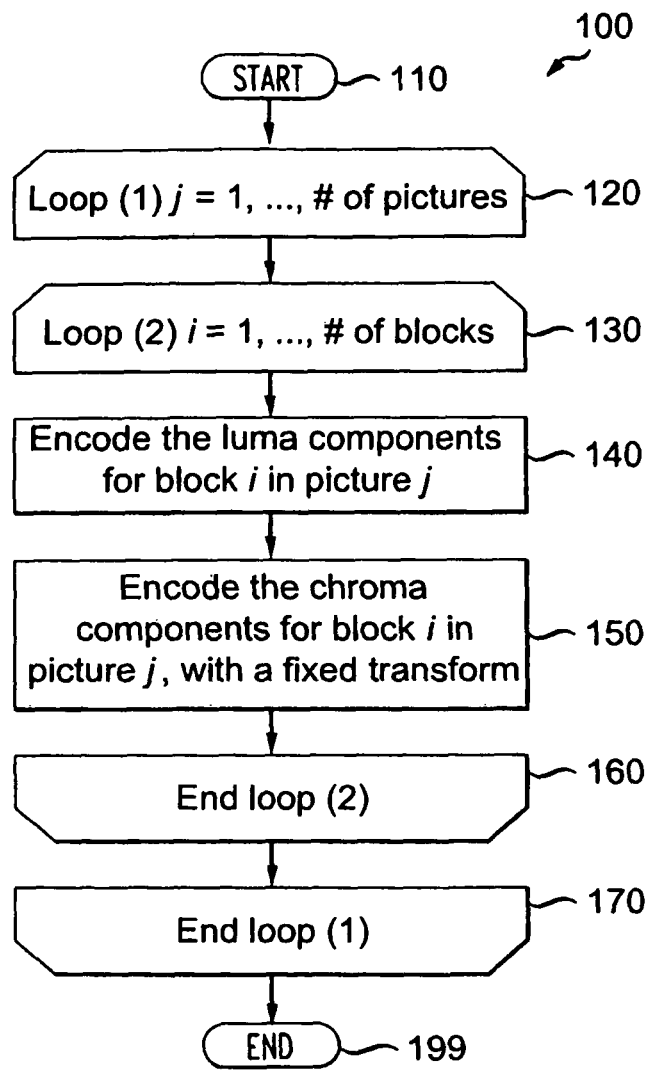
FIG. 1 is a flow diagram showing a conventional method for chroma encoding in a video encoder, in accordance with the prior art.
Figure 2:
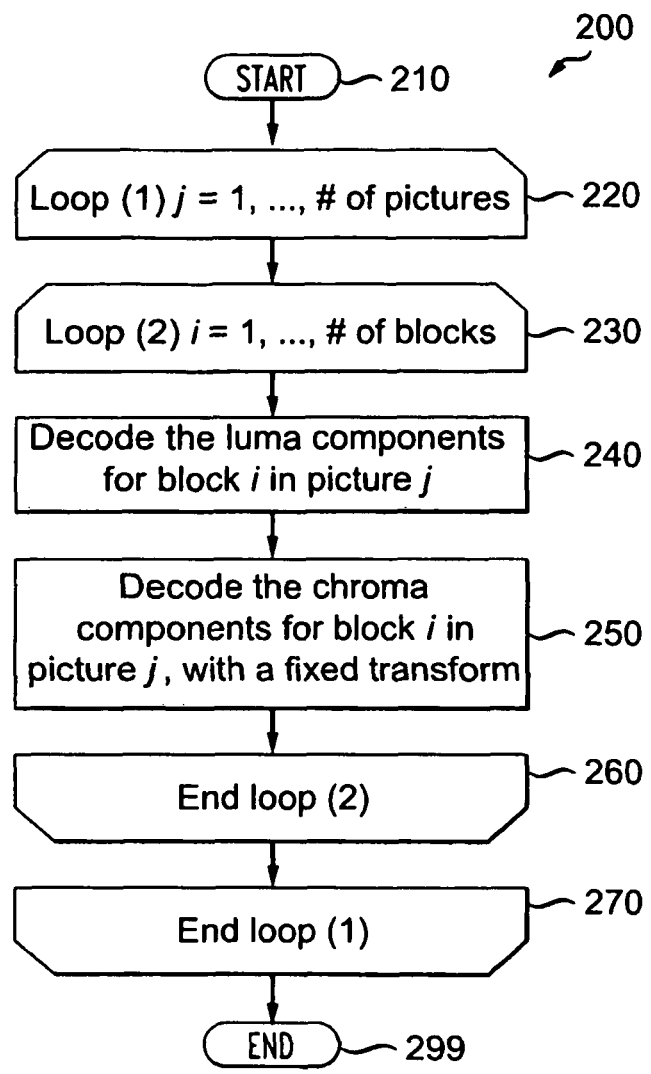
FIG. 2 is a flow diagram showing a conventional method for chroma decoding in a video decoder, in accordance with the prior art.

The present principles are directed to methods and apparatus for improved chroma transforms for inter frames in video encoding and decoding. The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the word "signal" refers to indicating something to a corresponding decoder. For example, the encoder may signal a particular one of a group of transforms and/or inverse transforms in order to make the decoder aware of which particular transforms and/or inverse transforms were used on the encoder side. In this way, the same transforms may be used at both the encoder side and the decoder side. Thus, for example, an encoder may transmit a particular transform and/or inverse transform to the decoder so that the decoder may use the same particular transform and/or inverse transform or, if the decoder already has the particular transform and/or inverse transform as well as others, then signaling may be used (without transmitting) to simply allow the decoder to know and select the particular transform and/or inverse transform. By avoiding transmission of any actual transforms, a bit savings may be realized. It is to be appreciated that signaling may be accomplished in a variety of ways. For example, one or more syntax elements, flags, and so forth may be used to signal information to a corresponding decoder.

Moreover, as used herein, the phrase "causal neighboring blocks" refers to the neighboring blocks that precede the current block in terms of the encoding or decoding order. Thus such blocks are already encoded or decoded when the current block is handled.

For purposes of illustration and description, examples are described herein in the context of improvements over KTA software used in conjunction with the MPEG-4 AVC Standard. However, it is to be appreciated that the present principles are not limited solely to the same. Given the teachings of the present principles provided herein, one of ordinary skill in this and related arts would readily understand that the present principles are equally applicable and would provide at least similar benefits when applied to extensions of other standards, or when applied and/or incorporated within standards not yet developed. It is to be further appreciated that the present principles also apply to video encoders and video decoders that do not conform to standards, but rather confirm to proprietary definitions.

Furthermore, for the sake of simplicity, the present principles are described using a 4:2:0 chrominance format. However, one of ordinary skill in this and related arts would readily understand that the present principles can be readily applied to other formats (e.g., the 4:2:2 format, the 4:4:4 format, and so forth).

Figure 3:
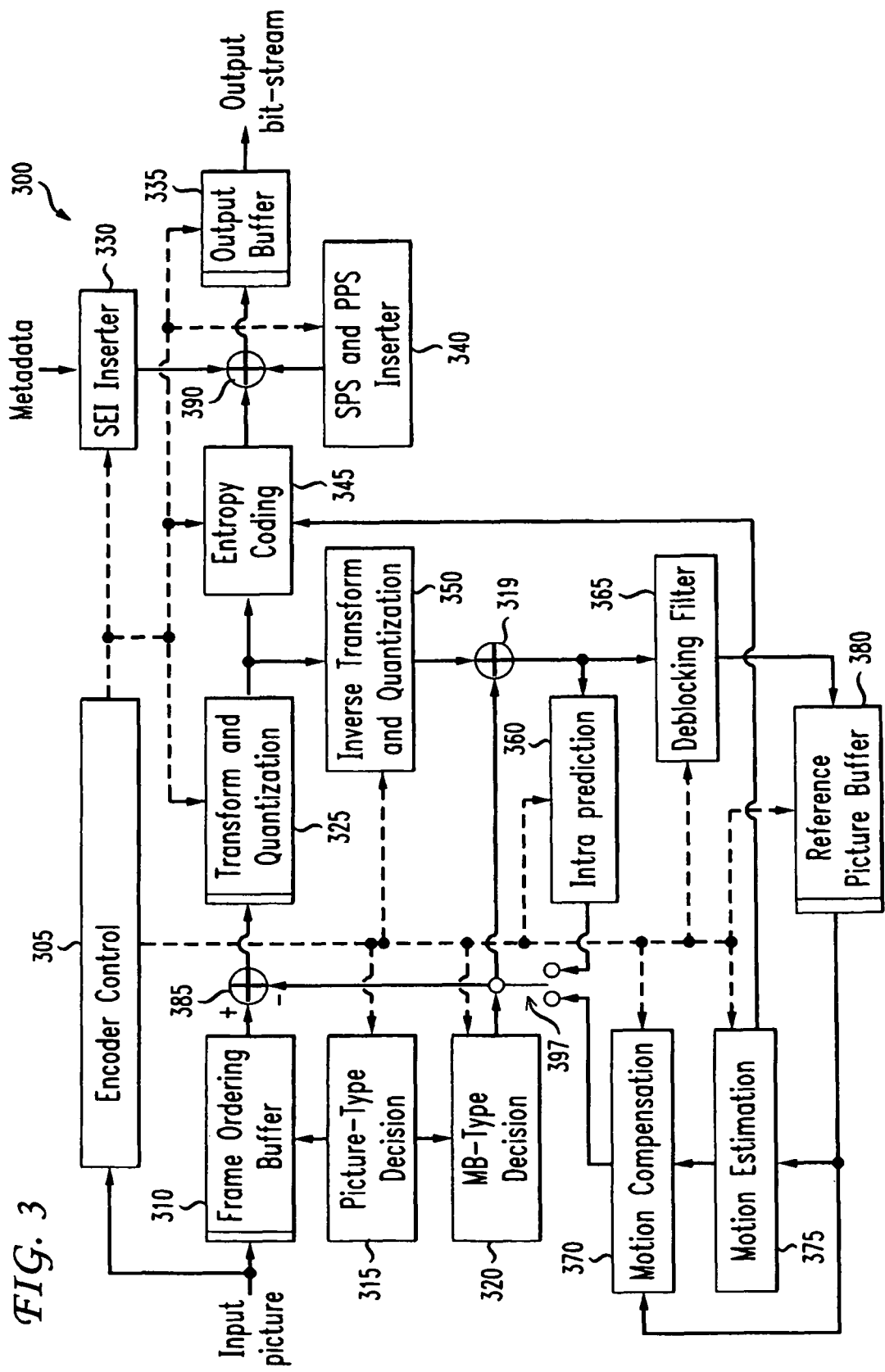
FIG. 3 is a block diagram showing an exemplary video encoder to which the present principles may be applied, in accordance with an embodiment of the present principles.

Turning to FIG. 3, an exemplary video encoder to which the present principles may be applied is indicated generally by the reference numeral 300. The video encoder 300 includes a frame ordering buffer 310 having an output in signal communication with a non-inverting input of a combiner 385. An output of the combiner 385 is connected in signal communication with a first input of a transformer and quantizer 325. An output of the transformer and quantizer 325 is connected in signal communication with a first input of an entropy coder 345 and a first input of an inverse transformer and inverse quantizer 350. An output of the entropy coder 345 is connected in signal communication with a first non-inverting input of a combiner 390. An output of the combiner 390 is connected in signal communication with a first input of an output buffer 335.

A first output of an encoder controller 305 is connected in signal communication with a second input of the frame ordering buffer 310, a second input of the inverse transformer and inverse quantizer 350, an input of a picture-type decision module 315, a first input of a macroblock-type (MB-type) decision module 320, a second input of an intra prediction module 360, a second input of a deblocking filter 365, a first input of a motion compensator 370, a first input of a motion estimator 375, and a second input of a reference picture buffer 380.

A second output of the encoder controller 305 is connected in signal communication with a first input of a Supplemental Enhancement Information (SEI) inserter 330, a second input of the transformer and quantizer 325, a second input of the entropy coder 345, a second input of the output buffer 335, and an input of the Sequence Parameter Set (SPS) and Picture Parameter Set (PPS) inserter 340.

An output of the SEI inserter 330 is connected in signal communication with a second non-inverting input of the combiner 390.

A first output of the picture-type decision module 315 is connected in signal communication with a third input of the frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390.

An output of the inverse quantizer and inverse transformer 350 is connected in signal communication with a first non-inverting input of a combiner 319. An output of the combiner 319 is connected in signal communication with a first input of the intra prediction module 360 and a first input of the deblocking filter 365. An output of the deblocking filter 365 is connected in signal communication with a first input of a reference picture buffer 380. An output of the reference picture buffer 380 is connected in signal communication with a second input of the motion estimator 375 and a third input of the motion compensator 370. A first output of the motion estimator 375 is connected in signal communication with a second input of the motion compensator 370. A second output of the motion estimator 375 is connected in signal communication with a third input of the entropy coder 345.

An output of the motion compensator 370 is connected in signal communication with a first input of a switch 397. An output of the intra prediction module 360 is connected in signal communication with a second input of the switch 397. An output of the macroblock-type decision module 320 is connected in signal communication with a third input of the switch 397. The third input of the switch 397 determines whether or not the "data" input of the switch (as compared to the control input, i.e., the third input) is to be provided by the motion compensator 370 or the intra prediction module 360. The output of the switch 397 is connected in signal communication with a second non-inverting input of the combiner 319 and an inverting input of the combiner 385.

A first input of the frame ordering buffer 310 and an input of the encoder controller 305 are available as inputs of the encoder 100, for receiving an input picture. Moreover, a second input of the Supplemental Enhancement Information (SEI) inserter 330 is available as an input of the encoder 300, for receiving metadata. An output of the output buffer 335 is available as an output of the encoder 300, for outputting a bitstream.

Figure 4:
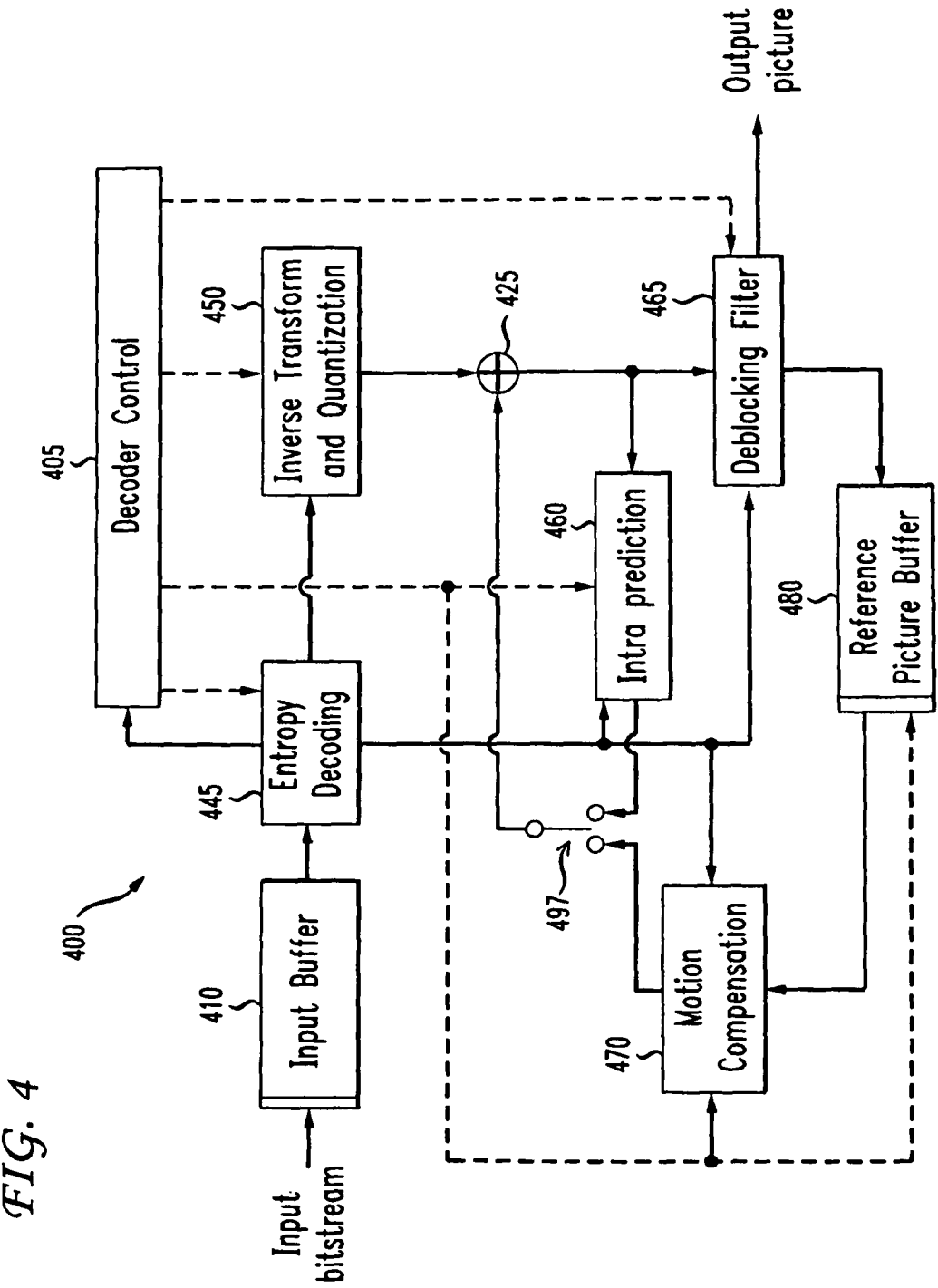
FIG. 4 is a block diagram showing an exemplary video decoder to which the present principles may be applied, in accordance with an embodiment of the present principles.

Turning to FIG. 4, an exemplary video decoder to which the present principles may be applied is indicated generally by the reference numeral 400. The video decoder 400 includes an input buffer 410 having an output connected in signal communication with a first input of an entropy decoder 445. A first output of the entropy decoder 445 is connected in signal communication with a first input of an inverse transformer and inverse quantizer 450. An output of the inverse transformer and inverse quantizer 450 is connected in signal communication with a second non-inverting input of a combiner 425. An output of the combiner 425 is connected in signal communication with a second input of a deblocking filter 465 and a first input of an intra prediction module 460. A second output of the deblocking filter 465 is connected in signal communication with a first input of a reference picture buffer 480. An output of the reference picture buffer 480 is connected in signal communication with a second input of a motion compensator 470.

A second output of the entropy decoder 445 is connected in signal communication with a third input of the motion compensator 470, a first input of the deblocking filter 465, and a third input of the intra predictor 460. A third output of the entropy decoder 445 is connected in signal communication with an input of a decoder controller 405. A first output of the decoder controller 405 is connected in signal communication with a second input of the entropy decoder 445. A second output of the decoder controller 405 is connected in signal communication with a second input of the inverse transformer and inverse quantizer 450. A third output of the decoder controller 405 is connected in signal communication with a third input of the deblocking filter 465. A fourth output of the decoder controller 405 is connected in signal communication with a second input of the intra prediction module 460, a first input of the motion compensator 470, and a second input of the reference picture buffer 480.

An output of the motion compensator 470 is connected in signal communication with a first input of a switch 497. An output of the intra prediction module 460 is connected in signal communication with a second input of the switch 497. An output of the switch 497 is connected in signal communication with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

As noted above, the present principles are directed to methods and apparatus for improved chroma transforms for inter frames in video encoding and decoding. That is, we propose methods and apparatus to improve the transforms of the chroma components for the inter pictures, and we propose new transforms to improve the coding efficiency of chroma components for inter frames. In one embodiment, we introduce more transforms into the chroma components for the inter pictures and allow the encoder to choose from multiple transforms. We also disclose and describe methods for choosing and signaling the selected transform.

Improved Method 1—Determine Chroma Transform Based on Luma Information

Figure 5:
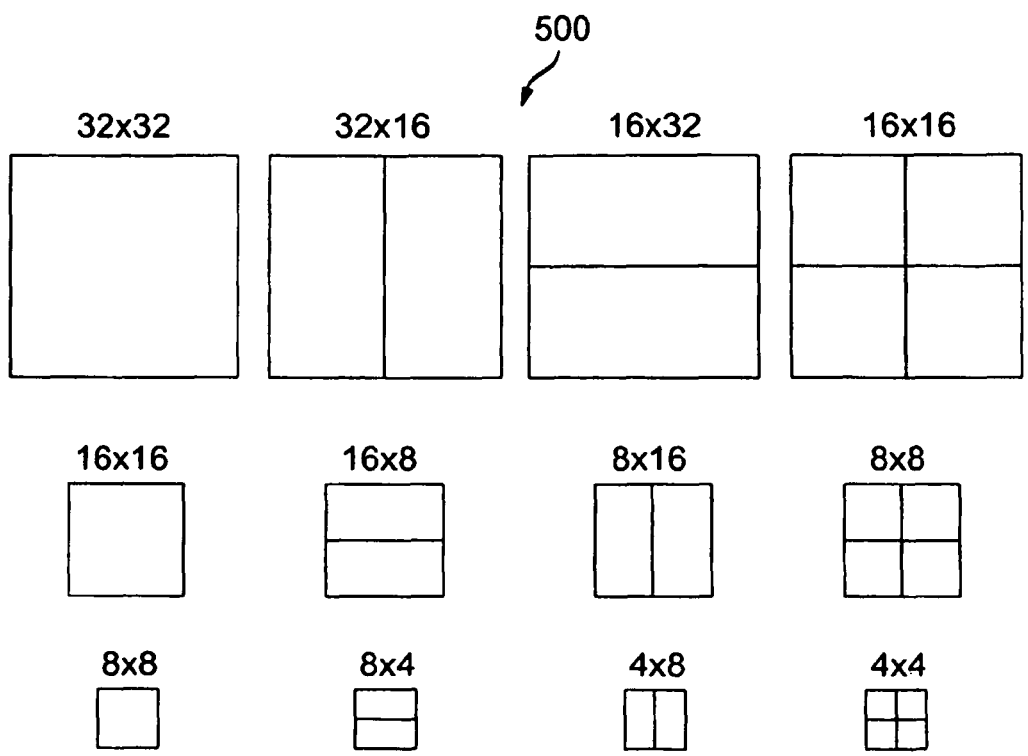
FIG. 5 is a diagram showing motion partitions permitted by KTA in 32×32 blocks to which the present principles can be applied, in accordance with an embodiment of the present principles.

In the KTA software, macroblock sizes of 32×32 and 64×64 are supported. For 32×32 blocks, in addition to the existing MPEG-4 AVC Standard motion partition sizes (16×16, 16×8, 8×16, 8×8, 8×4, 4×8, and 4×4), inter coding using 32×32, 32×16 and 16×32 partitions is also enabled. Turning to FIG. 5, motion partitions permitted by KTA in 32×32 blocks to which the present principles can be applied are indicated generally by the reference numeral 500. For the macroblock size of 64×64, 64×64, 64×32, and 32×64 partitions are additionally used.

Larger transforms can better capture the usually smoother content in high-definition video. For inter pictures, 16×16, 16×8, and 8×16 transforms are used in addition to 4×4 and 8×8 transforms for the luma components. Specifically, for each motion partition of sizes 16×16, 16×8, and 8×16, 16×16, 16×8, and 8×16 transforms may be used in addition to the 4×4 and 8×8 transforms. For motion partitions bigger than 16×16, 16×16 transforms are used in addition to 4×4 and 8×8 transforms.

To also better capture the smoother content in the chroma components, we propose to introduce larger transforms for chroma. Considering the 4:2:0 chrominance format, the chroma partition is one-quarter as large as its luma counterpart because the chroma component is halved in both dimensions. Since a larger motion partition size is often chosen for a smooth area, it is reasonable to design the transform in proportion to the motion partition size. In one embodiment, the transform of the partition size is used, with a constraint of a largest transform and a smallest transform. For example, when the motion partition is 16×16, then an 8×8 transform (half of 16×16 in both directions) is used for chroma. When the motion partition is 64×64, then the largest transform 16×16 is used for chroma.

A First Variation of Improved Method 1

Regarding another consideration, the transform size for the chroma partition should also reflect the dependence between the co-located luma and chroma components. In one example, the chroma transform is decided by the luma transform from the same motion partition. In one embodiment, the chroma transform is aligned with the luma transform, but halved in both dimensions (8×8 luma transform means 4×4 chroma transform), possibly with a constraint of the largest transform size and the smallest transform size (4×4 cascaded transform).

A Second Variation of Improved Method 1

Regarding yet another consideration, the chroma transform size should reflect both the motion partition size and the luma transform size, and can be decided as a function of both parameters. For one example, when the motion partition size is larger than a threshold, the chroma transform size is determined by the luma transform size. Otherwise, the chroma transform size is determined by the motion partition information size.

Figure 6:
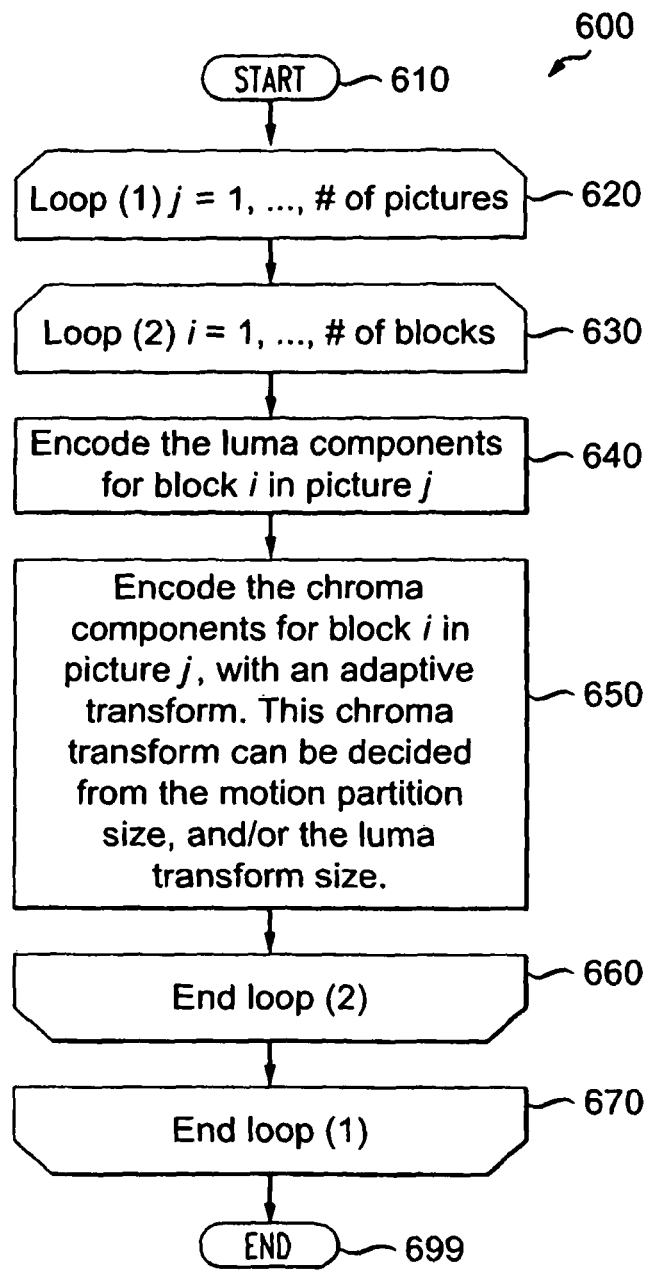
FIG. 6 is a flow diagram showing an exemplary method for encoding a video sequence using an adaptive transform for the chroma component in the inter pictures, in accordance with an embodiment of the present principles.

Turning to FIG. 6, an exemplary method for encoding a video sequence using an adaptive transform for the chroma component in the inter pictures is indicated generally by the reference numeral 600. The method 600 includes a start block 610 that passes control to a loop limit block 620. The loop limit block 620 begins a first loop (Loop (1)), using a variable j having a range from 1, ..., number (#) of pictures (e.g., in an input video sequence), and passes control to a loop limit block 630. The loop limit block 630 begins a second loop (Loop (2)), using a variable i having a range from 1, ..., number (#) of blocks (e.g., in a current picture of the input video sequence), and passes control to a function block 640. The function block 640 encodes the luma components for block i in picture j, and passes control to a function block 650. The function block 650 encodes the chroma components for block i in picture) with an adaptive transform, and passes control to a loop limit block 660. The loop limit block 660 ends the Loop (2), and passes control to a function block 670. The function block 670 ends the Loop (1), and passes control to an end block 699. Regarding function block 650, it is to be appreciated that the chroma transform may be adaptively determined from, e.g., the motion partition size and/or the luma transform size.

Figure 7:
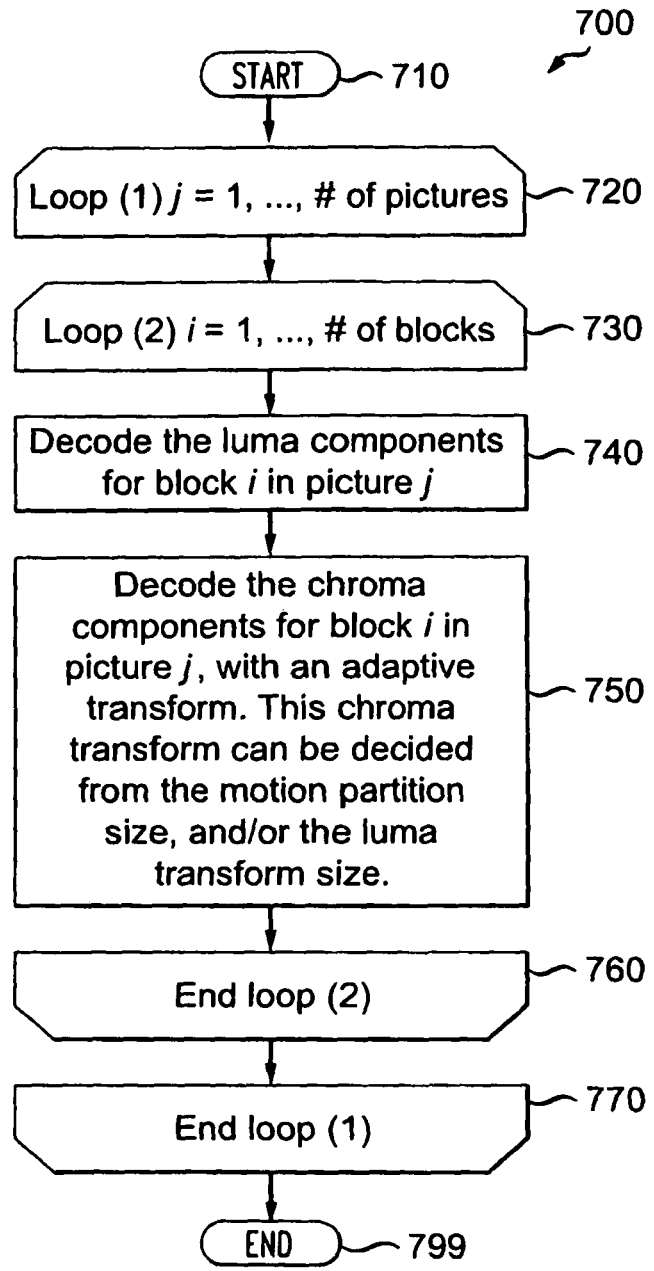
FIG. 7 is a flow diagram showing an exemplary method for decoding a video sequence using an adaptive transform for the chroma component in the inter pictures, in accordance with an embodiment of the present principles.

Turning to FIG. 7, an exemplary method for decoding a video sequence using an adaptive transform for the chroma component in the inter pictures is indicated generally by the reference numeral 700. The method 700 includes a start block 710 that passes control to a loop limit block 720. The loop limit block 720 begins a first loop (Loop (1)), using a variable j having a range from 1, ..., number (#) of pictures (e.g., in an input bitstream), and passes control to a loop limit block 730. The loop limit block 730 begins a second loop (Loop (2)), using a variable i having a range from 1, ..., number (#) of blocks (e.g., in a current picture of the input bitstream), and passes control to a function block 740. The function block 740 decodes the luma components for block i in picture j, and passes control to a function block 750. The function block 750 decodes the chroma components for block i in picture j with an adaptive transform, and passes control to a loop limit block 760. The loop limit block 760 ends the Loop (2), and passes control to a function block 770. The function block 770 ends the Loop (1), and passes control to an end block 799. Regarding function block 750, it is to be appreciated that the chroma transform may be adaptively determined from, e.g., the motion partition size and/or the luma transform size.

Improved Method 1—Determine Chroma Transform Independent of Luma Information

The above-described methods introduce more transforms into the chroma components for inter pictures. Moreover, the transform size for chroma is derived from the luma information and no overhead cost is necessary. On the other hand, the chroma and luma components are often not highly correlated and, thus, determining the chroma transform size from the luma information may cause the encoder to fail to capture the content characteristics in the chroma component.

Thus, in accordance with this method, we propose to determine the chroma transform size based on its own information. The encoder has to decide which transforms to use. One approach is to compute the rate-distortion (RD) RD-cost of using each transform size and choose the transform size yielding the minimum cost. After the transform size is selected, the transform needs to be indicated. The transform size can be determined/indicated on a block level, a slice level, a picture level, a sequence level, and so forth. Using the block level as an example, we can signal the chosen transform size for each block. When the correlation between the luma and chroma is considered, only the difference between the luma and chroma transform sizes needs to be encoded.

To further reduce the overhead cost incurred by indicating the chroma transform size, one approach is to indicate such information implicitly. In particular, this information will be derived using the same formula at both the encoder and decoder. In one embodiment, the median transform size of the causal neighboring blocks is used for the current block, possibly with a constraint on the largest and smallest transform sizes. In addition to the transform size, other information, such as motion partition information, luma transform information, can also be used to derive the transform for the current block.

Figure 8:
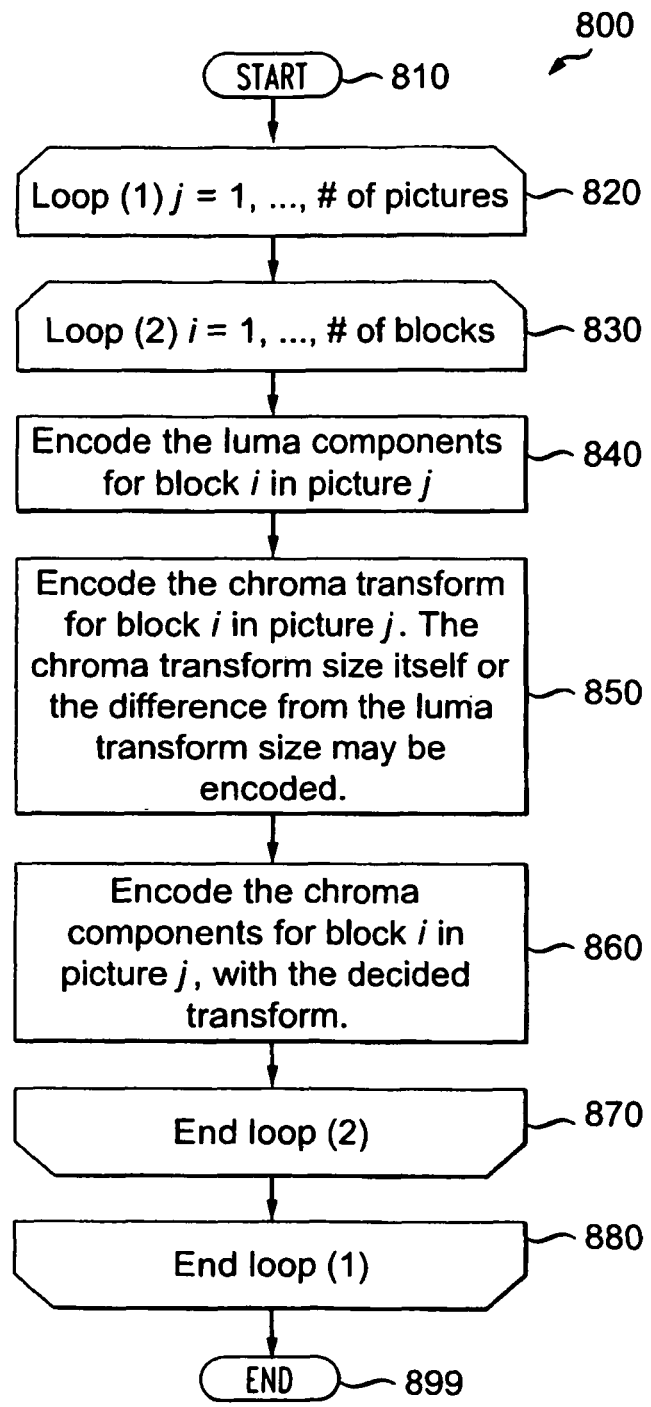
FIG. 8 is a flow diagram showing an exemplary method for encoding a video sequence using an adaptive transform for the chroma component in the inter pictures, in accordance with an embodiment of the present principles.
Figure 9:
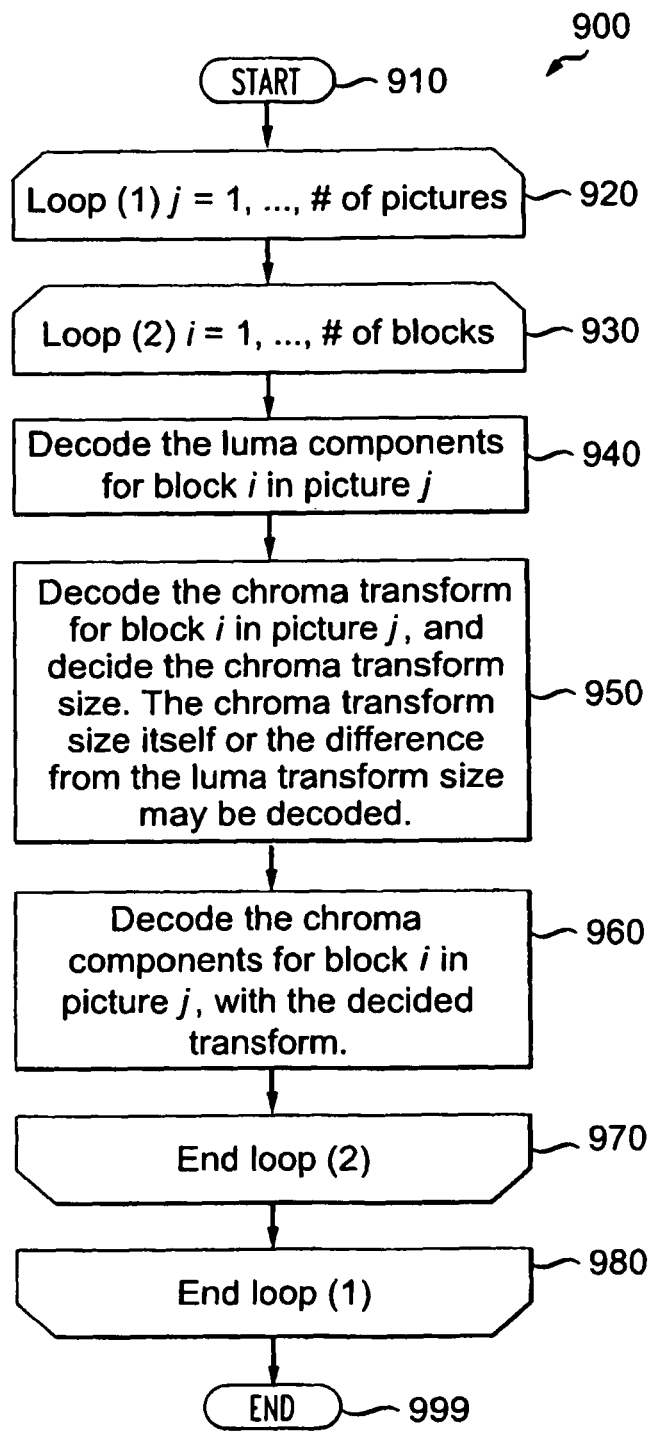
FIG. 9 is a flow diagram showing an exemplary method for decoding a video sequence using an adaptive transform for the chroma component in the inter pictures, in accordance with an embodiment of the present principles.

FIGS. 8 and 9 hereinafter are directed to embodiments of the present principles that involve explicit signaling of the chroma transform by an encoder to a corresponding decoder.

Turning to FIG. 8, an exemplary method for encoding a video sequence using an adaptive transform for the chroma component in the inter pictures is indicated generally by the reference numeral 800. In the method 800, the transform for the chroma component is explicitly signaled in a resultant bitstream. The method 800 includes a start block 810 that passes control to a loop limit block 820. The loop limit block 820 begins a first loop (Loop (1)), using a variable j having a range from 1, ..., number (#) of pictures (e.g., in an input video sequence), and passes control to a loop limit block 830. The loop limit block 830 begins a second loop (Loop (2)), using a variable i having a range from 1, ..., number (#) of blocks (e.g., in a current picture of the input video sequence), and passes control to a function block 840. The function block 840 encodes the luma components for block i in picture j, and passes control to a function block 850. The function block 850 encodes the chroma transform for block i in picture j, and passes control to a function block 860. The function block 860 encodes the chroma components for block i in picture j with the decided transform and passes control to a loop limit block 870. The loop limit block 870 ends the Loop (2), and passes control to a function block 880. The function block 880 ends the Loop (1), and passes control to an end block 899. Regarding function block 850, it is to be appreciated that the chroma transform size itself or the difference from the luma transform size may be encoded.

Turning to FIG. 9, an exemplary method for decoding a video sequence using an adaptive transform for the chroma component in the inter pictures is indicated generally by the reference numeral 900. In the method 900, the transform for the chroma component is explicitly determined from an input bitstream. The method 900 includes a start block 910 that passes control to a loop limit block 920. The loop limit block 920 begins a first loop (Loop (1)), using a variable j having a range from 1, ..., number (#) of pictures (e.g., in an input bitstream), and passes control to a loop limit block 930. The loop limit block 930 begins a second loop (Loop (2)), using a variable i having a range from 1, . . . , number (#) of blocks (e.g., in a current picture of the input bitstream), and passes control to a function block 940. The function block 940 decodes the luma components for block i in picture j, and passes control to a function block 950. The function block 950 decodes the chroma transform for block i in picture j, decides the transform size of the chroma transform, and passes control to a function block 960. The function block 960 decodes the chroma components for block i in picture j with the decided transform and passes control to a loop limit block 970. The loop limit block 970 ends the Loop (2), and passes control to a function block 980. The function block 980 ends the Loop (1), and passes control to an end block 999. Regarding function block 950, it is to be appreciated that the chroma transform size itself or the difference from the luma transform size may be decoded.

Figure 10:
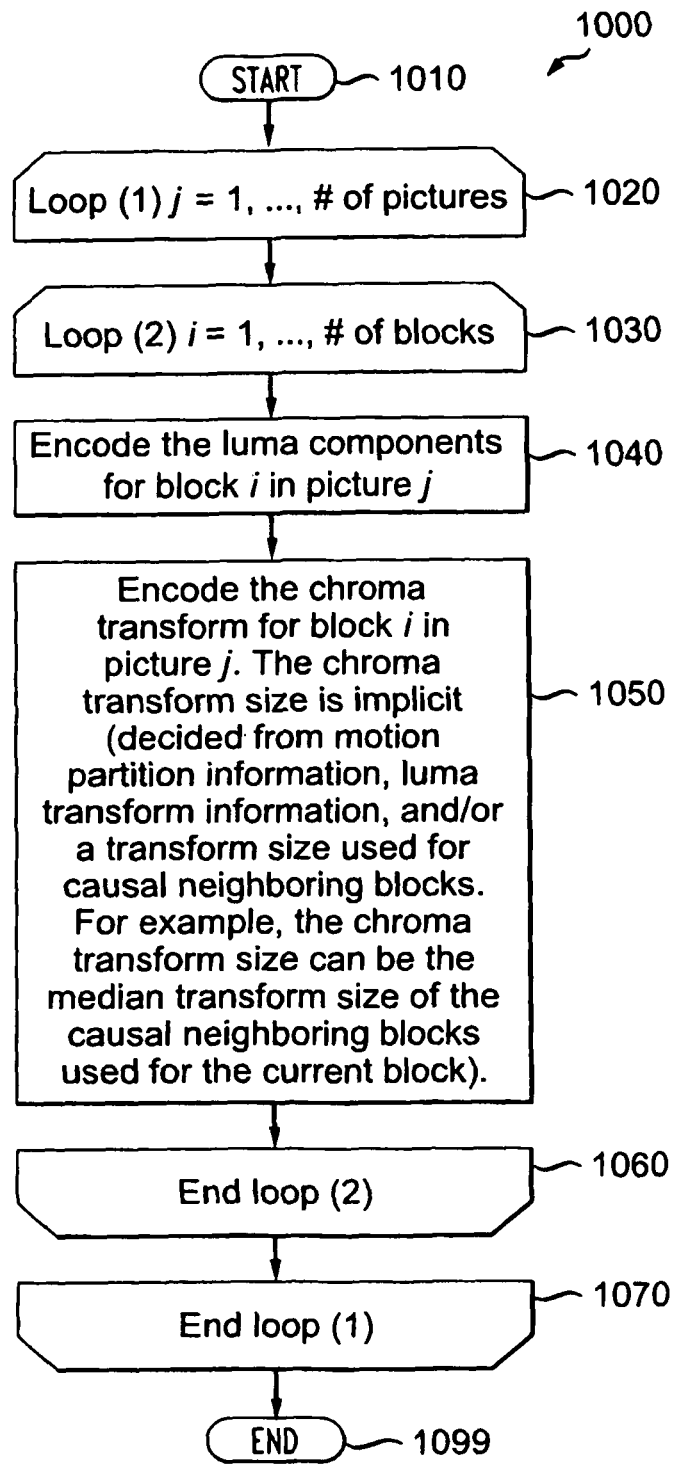
FIG. 10 is a flow diagram showing another exemplary method for encoding a video sequence using an adaptive transform for the chroma component in the inter pictures, in accordance with an embodiment of the present principles.
Figure 11:
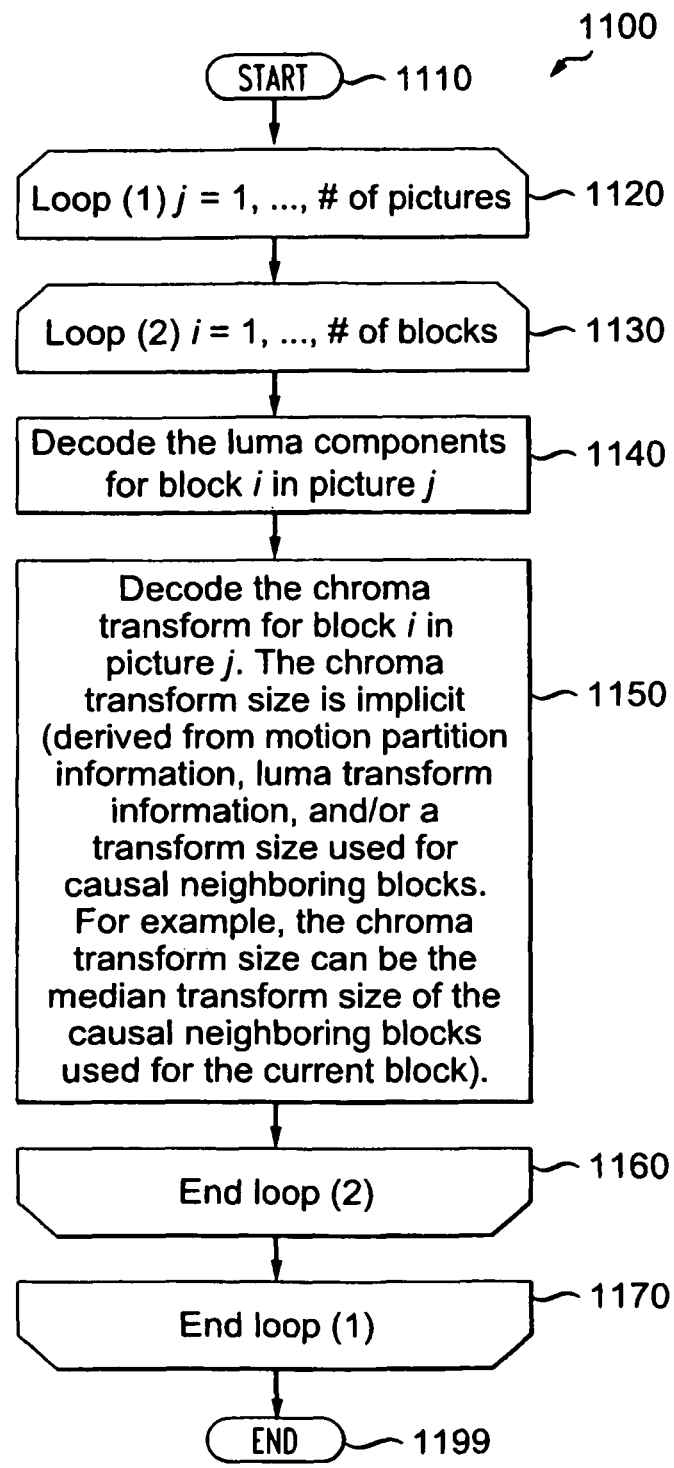
FIG. 11 is a flow diagram showing another exemplary method for decoding a video sequence using an adaptive transform for the chroma component in the inter pictures, in accordance with an embodiment of the present principles.

FIGS. 10 and 11 hereinafter are directed to embodiments of the present principles that involve deriving the chroma transform by an encoder and a corresponding decoder, and, hence, avoid having to explicitly signal the chroma transform.

Turning to FIG. 10, another exemplary method for encoding a video sequence using an adaptive transform for the chroma component in the inter pictures is indicated generally by the reference numeral 1000. In the method 1000, the transform for the chroma component is not signaled in a resultant bitstream and, hence, is implicitly derived from a corresponding decoder. The method 1000 includes a start block 1010 that passes control to a loop limit block 1020. The loop limit block 1020 begins a first loop (Loop (1)), using a variable j having a range from 1, . . . , number (#) of pictures (e.g., in an input video sequence), and passes control to a loop limit block 1030. The loop limit block 1030 begins a second loop (Loop (2)), using a variable i having a range from 1, . . . , number (#) of blocks (e.g., in a current picture of the input video sequence), and passes control to a function block 1040. The function block 1040 encodes the luma components for block i in picture j, and passes control to a function block 1050. The function block 1050 encodes the chroma transform for block i in picture j, and passes control to a loop limit block 1060. The loop limit block 1060 ends the Loop (2), and passes control to a function block 1070. The function block 1070 ends the Loop (1), and passes control to an end block 1099. Regarding function block 1050, the chroma transform size is implicit. The chroma transform size may be determined from motion partition information, luma transform information, and/or a transform size used for causal neighboring blocks. For example, in one embodiment, the median transform size of the causal neighboring blocks is used for the current block.

Turning to FIG. 11, another exemplary method for decoding a video sequence using an adaptive transform for the chroma component in the inter pictures is indicated generally by the reference numeral 1100. In the method 1100, the transform for the chroma component is implicitly derived. The method 1100 includes a start block 1110 that passes control to a loop limit block 1120. The loop limit block 1120 begins a first loop (Loop (1)), using a variable j having a range from 1, . . . , number (#) of pictures (e.g., in an input video sequence), and passes control to a loop limit block 1130. The loop limit block 1130 begins a second loop (Loop (2)), using a variable i having a range from 1, . . . , number (#) of blocks (e.g., in a current picture of the input video sequence), and passes control to a function block 1140. The function block 1140 decodes the luma components for block i in picture j, and passes control to a function block 1150. The function block 1150 decodes the chroma transform for block i in picture j, and passes control to a loop limit block 1160. The loop limit block 1160 ends the Loop (2), and passes control to a function block 1170. The function block 1170 ends the Loop (1), and passes control to an end block 1199. Regarding function block 1150, the chroma transform size is implicit. The chroma transform size may be determined from motion partition information, luma transform information, and/or a transform size used for causal neighboring blocks. For example, in one embodiment, the median transform size of the causal neighboring blocks is used for the current block.

Syntax

Presuming the transform size for the chroma component is indicated for each block explicitly, we provide examples on how to define the syntax to apply the present principles. The syntax can be applied on various levels, such as at the motion partition level, the slice level, the picture level, and/or so forth. TABLE 1 shows exemplary macroblock layer syntax for the case where the transform size is directly sent from an encoder to a corresponding decoder, in accordance with an embodiment of the present principles. In this example, we consider three transform sizes: 4×4; 8×8; and 16×16. TABLE 2 shows exemplary macroblock layer syntax for the case where the difference between the chroma and luma transform sizes is sent from an encoder to a corresponding decoder. The transform size is only needed when the chroma residue is inter encoded, i.e., mb_type !=INTRA, CodedBlockPatternChroma>0, and the current macroblock is not encoded as a DIRECT or SKIP mode.

TABLE 1

| macroblock_layer( ) { | C | Descriptor |
|---|---|---|
| ... | | |
| | 0 | |
| if( CodedBlockPatternChroma > 0 && mb_type != INTRA && ( mb_type != DIRECT \| \| SKIP ) ) { | | |
| transform_size_chroma | 1 | ae(v) |
| } | | |
| ... | | |
| } | | |

TABLE 2

| macroblock_layer( ) { | C | Descriptor |
|---|---|---|
| ... | | |
| | 0 | |
| if( CodedBlockPatternChroma > 0 && mb_type != INTRA && ( mb_type != DIRECT \| \| SKIP ) ) { | | |
| transform_size_chroma_luma_difference | 1 | ae(v) |
| } | | |
| ... | | |
| } | | |

The semantics of some of the syntax elements of TABLE 1 and TABLE 2 are as follows:

transform_size_chroma specifies the value of the transform size for the chroma in the macroblock.

transform_size_chroma_luma_difference specifies the difference between the chroma and luma transform sizes in the macroblock. The chroma transform size can be obtained by adding this value and the luma transform size.

A description will now be given of some of the many attendant advantages/features of the present invention, some of which have been mentioned above. For example, one advantage/feature is an apparatus having a video encoder for encoding at least a portion of a picture using inter-coding. A transform is adaptively selected, from among a plurality of transforms, to apply to chroma components of the portion responsive to at least one selection criterion.

Another advantage/feature is the apparatus having the video encoder as described above, wherein the at least one selection criterion includes at least one of motion partition information and luma transform information.

Yet another advantage/feature is the apparatus having the video encoder as described above, wherein the transform is explicitly signaled to a corresponding decoder.

Still another advantage/feature is the apparatus having the video encoder wherein the transform is explicitly signaled to a corresponding decoder as described above, wherein an encoded difference between chroma and luma transform sizes is explicitly signaled to the corresponding decoder.

Moreover, another advantage/feature is the apparatus having the video encoder as described above, wherein a chroma transform size, corresponding to the transform, is derived implicitly.

Further, another advantage/feature is the apparatus having the video encoder wherein a chroma transform size, corresponding to the transform, is derived implicitly as described above, wherein the chroma transform size is derived implicitly from at least one of motion partition information, luma transform information, and a transform size used for causal neighboring blocks with respect to the portion.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
   a video encoder for encoding at least a portion of a picture using intercoding,
   wherein a transform is adaptively selected, from among a plurality of transforms, to apply to chroma components of the portion responsive to at least one selection criterion,
   wherein the transform is explicitly signaled to a corresponding decoder, and wherein an encoded difference between chroma and luma transform sizes is also explicitly signaled to the corresponding decoder using macroblock layer syntax.

2. The apparatus of claim 1, wherein the at least one selection criterion comprises at least one of motion partition information and luma transform information.

3. The apparatus of claim 1, wherein a chroma transform size, corresponding to the transform, is derived implicitly.

4. In a video encoder, a method, comprising:
   encoding at least a portion of a picture using inter-coding,
   wherein a transform is adaptively selected, from among a plurality of transforms, to apply to chroma components of the portion responsive to at least one selection criterion,
   wherein the transform is explicitly signaled to a corresponding decoder, and wherein an encoded difference between chroma and luma transform sizes is also explicitly signaled to the corresponding decoder using macroblock layer syntax.

5. The method of claim 4, wherein the at least one selection criterion comprises at least one of motion partition information and luma transform information.

6. The method of claim 4, wherein a chroma transform size, corresponding to the transform, is derived implicitly.

7. An apparatus, comprising:
   a video decoder for decoding at least an inter-coded portion of a picture using a transform adaptively selected for application to chroma components of the inter-coded portion, wherein the transform is adaptively selected responsive to at least one selection criterion,
   wherein the transform is explicitly received from a corresponding encoder, and wherein an encoded difference between chroma and luma transform sizes is also explicitly received from the corresponding encoder using macroblock layer syntax.

8. The apparatus of claim 7, wherein the at least one selection criterion comprises at least one of motion partition information and luma transform information.

9. The apparatus of claim 7, wherein the chroma transform size, corresponding to the transform, is derived implicitly.

10. In a video decoder, a method, comprising:
    decoding at least an inter-coded portion of a picture using a transform adaptively selected for application to chroma components of the inter-coded portion, wherein the transform is adaptively selected responsive to at least one selection criterion,
    wherein the transform is explicitly received from a corresponding encoded stream, and wherein an encoded difference between chroma and luma transform sizes is also explicitly received from the corresponding encoded stream using macroblock layer syntax.

11. The method of claim 10, wherein the at least one selection criterion comprises at least one of motion partition information and luma transform information.

12. The method of claim 10, wherein the chroma transform size, corresponding to the transform, is derived implicitly.

13. A non-transitory computer readable storage media having video signal data encoded thereupon, comprising:

at least a portion of a picture encoded using inter-coding, wherein a transform is adaptively selected, from among a plurality of transforms, to apply to chroma components of the portion responsive to at least one selection criterion, wherein the transform is explicitly signaled in the video signal data, and an encoded difference between chroma and luma transform sizes is also explicitly signaled in the video signal data.

* * * * *